Nov. 22, 1966
D. E. LAMBETH
3,286,647
HYDRAULIC APPARATUS
Filed Feb. 3, 1965
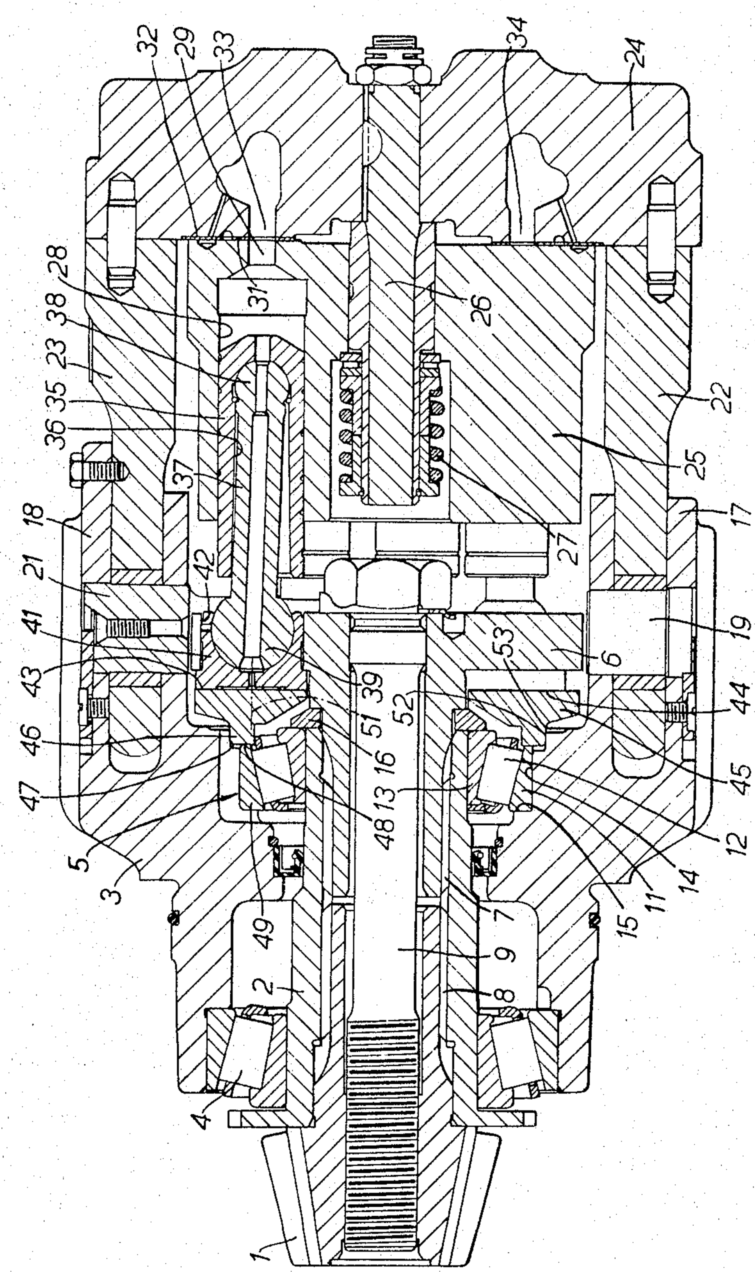
INVENTOR
BY Dennis E. Lambeth
Orland M. Christensen
ATTORNEY

United States Patent Office 3,286,647

Patented Nov. 22, 1966

3,286,647

HYDRAULIC APPARATUS

Dennis E. Lambeth, Cheltenham, England, assignor to Dowty Technical Developments Limited, Cheltenham, England, a British company Filed Feb. 3, 1965, Ser. No. 430,111

Claims priority, application Great Britain, Feb. 8, 1964, 5,386/64

2 Claims. (Cl. 103—162)

This invention relates to hydraulic pumps or motors.

The present invention provides a hydraulic pump or motor comprising a rotatably mounted drive shaft, a drive flange fast on the drive shaft, a plurality of slippers capable of axial sliding movement in bores in the drive flange, a rotary cylinder barrel mounted for rotation about an axis inclined or inclinable to the drive flange axis and having a plurality of cylinders parallel to or inclined to the rotation axis, pistons slidably mounted one in each cylinder, piston rods articulated to the pistons and the slippers to form a plurality of assemblies each comprising a slipper, a piston and a piston rod, a wear plate mounted adjacent to the drive flange, the wear plate including a flat surface against which the slippers are adapted to bear during rotation of the drive flange and cylinder barrel, a radial thrust ball or roller bearing for the drive shaft mounted adjacent to the drive flange, and a bearing housing securing the outer race member of the bearing in position, one end surface of the race member being located against a machined surface in the bearing housing and the other end surface of the race member forming a support surface against which the wear plate is axially urged by the force exerted by the slippers.

The radial thrust bearing may be capable of resisting both axial and radial thrust.

The wear plate may include an annular projection by which it bears on the said race member.

The projection may be concentric with the circular path of the slippers on the flat surface.

The annular contact area between the race member and the projection preferably has inner and outer radii which respectively are less than and greater than the radius of the circular path of the centres of the slippers.

The outer surface of the projection may be rotatably located within a bore in the bearing housing which accommodates the said race member.

One embodiment of the invention will now be described with reference to the accompanying cross-sectional drawing. This embodiment is a hydraulic tilting head motor for use in vehicle propulsion which includes a bevel pinion 1 on the drive shaft 2 for engagement with the crown wheel of the conventional differential gear assembly. The drive shaft 2 is located within the bearing housing 3 by means of a pair of taper roller bearings 4 and 5. Internally of the motor the drive shaft 2 includes a drive flange 6 fixedly secured thereto by means of splines 7. The pinion 1 is secured to the shaft 2 by splines 8 and a screw threaded bolt 9 extends through the shaft to hold the drive flange 6 and the pinion tightly to the shaft.

The bearing 5 includes an annular outer race member 11, a caged set of rollers 12 and an inner race member 13. The outer race member 11 is tightly engaged in a bore 14 in the bearing housing 3 and abuts against a shoulder 15. The inner race member 13 is engaged on the shaft 2 and abuts against a flange 16 carried by the shaft. The two bearings 4 and 5 are capable of absorbing both radial and axial thrust. Axial thrust will result almost entirely from the reactions of the engagement of the teeth of pinion 1 with the teeth of the cooperating crown wheel.

Extending from the bearing housing 3 are a pair of bifurcated lugs 17 and 18. Pins respectively 19 and 21 extend through these bifurcated lugs and support in them a pair of arms respectively 22 and 23. In turn the arms support a valve plate 24 by means of a screw or like securing means. In between the arms 22 and 23 a rotary cylinder barrel 25 is mounted on the valve plate 25. A central axle 26 secured in the valve plate locates the cylinder barrel for rotation and spring means 27 urge the barrel against the valve plate.

Within the barrel 25 a plurality of cylinders 28 are formed whose axes are parallel to the rotation axis and which are equally spaced about the rotation axis. These cylinders connect respectively to cylinder ports 29 opening into the barrel surface 31 which is in rotating contact with the valve plate surface 32. A pair of main ports 33 and 34 open into the valve surface 32 and co-operate with the cylinder ports 29 during rotation of the barrel. These main ports are connected externally of the valve plate by flexible or pivoted connections to high and low pressure zones.

Within each cylinder a piston 35 is slidably mounted. Each piston is of substantial length and includes a long counter bore 36 which accommodates a connecting rod 37. A ball joint 38 secures each connecting rod into its piston at the inner end of the counter bore 36. The opposite end of each connecting rod 37 is formed with a ball joint 39 which engages within a slipper 41. Each slipper 41 is slidably mounted in a bore 42 in the drive flange 6 so as to be capable of sliding motion in a direction parallel to the axis of the drive shaft 2. Each slipper includes a slipper surface 43 which makes sliding contact with the wear surface 44 of a wear plate 45. Also for preferance each slipper 41 is mounted so as to be capable of slight tipping within its bore 42 so that the slipper surface 43 may accommodate itself to slight variations of the wear surface 44. The wear surface 44 of the wear plate is of annular form whose radial width is very slightly larger than the diameter of each of the slipper surfaces 43.

A cylindrical flange 46 extends from the wear plate 45 oppositely to the wear surface 44. The surface 47 at the end of the cylindrical flange is arranged to be a plane surface parallel to the wear surface 44. The surface 47 engages the end surface 48 of the outer race member 11 so that axial thrust from the slippers 41 passes through the wear plate, the flange 46 and surfaces 47 and 48 to the race member 11. The other end surface 49 of the outer race member 11 abuts against the shoulder 15 at the end of the bore 14. In the machining operation which forms the bore 14 during manufacture the shoulder 15 is also accurately machined to lie in a plane perpendicular to the rotation axis of the drive shaft 2. The outer race member 11 during manufacture is also formed such that its two end surfaces 48 and 49 are accurately perpendicular to the rotation axis of the shaft 2 to be carried by the bearing. It follows therefore that the wear surface 44 will be accurately located parallel to the rotation axis of the drive shaft 2 when axial load is exerted by the slippers 41 through the wear plate and the outer race member 11. It is preferred that the circle on which the centres of the slipper surfaces 43 are located should have a radius intermediate between the inner and outer radii of the annular contact area between the two surfaces 47 and 48. In the drawing the circle on which the centres of these slipper surfaces are located (indicated by dotted line 51) has a radius which is about the same as the inner radius of the annular contact area between the surfaces 47 and 48. The reason for this arrangement is that it is desirable for the reaction between the outer race member 11 and the flange 46 to pass approximately through the centres of the slipper surfaces 43 in order to reduce tendency of the wear surface 44 to assume a "dish" shape under load.

In operation of the hydraulic motor as shown pressure liquid is supplied to one of the ports 33 and 34. The tilting head assembly formed by the arms 22, 23, the valve plate 24 and the cylinder barrel 25 is located by a suitable adjusting means so that the rotation axis of the barrel is inclined to the rotation axis of the drive shaft 2. The pressure liquid is fed for example to the main port 33 from which it will pass to the cylinders 28 whose ports 29 connect with port 33. The action of such pressure on the pistons 35 will be produce a thrust which is transferred through the connecting rods 37 on slippers 41 to the wear plate 45. Due to the inclination of the two axes of rotation of the shaft 2 and the barrel 25 the pistons 35 under pressure will then move outwardly from their cylinders causing a driving torque to be applied to rotate the drive flange 6 through the medium of the slippers 41. The connecting rods 37 due to such rotation will contact the sides of the bores 36 in their pistons and rotate the cylinder barrel in synchronism with rotation of the drive flange 6. During rotation at the outermost position of each piston 35 it will change connection from the main port 33 to the main port 34 and then further rotation will cause inward movement of the piston to displace liquid at low pressure into the port 34.

The wear plate 45 is not fixed against rotation and in operation it will rotate but at a much slower rate than the speed of rotation of the drive flange. The pressure liquid from the cylinders may be supplied through the connecting rods to the slipper surfaces 43 to reduce the sliding friction between the slippers and the wear plate.

The bore 14 is preferably enlarged as indicated at 52 to receive and locate the outer cylindrical surface 53 of the flange 46. By this means the wear plate 45 is accurately located in a radial sense so that the slipper surfaces 43 may fully engage the wear surface 44. Whilst in the described embodiment the outer cylindrical surface 53 of the flange 46 fits in the enlarged bore 52 it will be appreciated that it is equally within the scope of the invention to arrange that the outer cylindrical surface 53 is of the same diameter as the bore 11 to avoid two machining operations in the forming of the bore 11.

In the design of the illustrated motor it is very desirable that the roller bearing 5 should be located as closely as possible to the drive flange 6 in order to reduce bending moments on the drive shaft 2 which are a function of the distance in the axial direction between the drive flange 6 and the bearing 5. The wear plate 44 must be located between the bearing 5 and the drive flange in order to take the slipper reaction. The obvious arrangement would be to locate the wear plate 45 against a machined surface in the bearing housing adjacent to the outer diameter of the wear plate 45. Unfortunately the centres of the slippers would then be considerably displaced from the position at which the wear plate engages the bearing housing and in operation the wear plate would be elastically distorted to assume a "dish" shape. This would prevent the slipper surfaces from engaging the wear surface accurately. The described embodiment by providing the flange 46 to engage the wear plate 45 on the outer race member 11 enables the centres of the slippers to be nearer to or substantially aligned with the position of reaction onto the bearing housing i.e. through the surfaces 48 and 49 so that there is a reduced tendency for the wear plate to distort under slipper load. A further small advantage is obtained in manufacture in that it is not necessary to machine within the bearing housing a special surface to receive the wear plate since it is possible to make use of the shoulder 15 already machined to receive the race member 14.

The described embodiment of the invention relates to a tilting head motor but the invention is equally applicable to a fixed head motor or to a tilting or fixed head pump. In the fixed head kind of pump or motor the cylinder block will be non-adjustably located for rotation about an axis inclined to the drive shaft axis.

I claim as my invention:

1. A hydraulic pump or motor comprising a rotatably mounted drive shaft, a drive flange fast on the drive shaft, a plurality of slippers capable to axial sliding movement in bores in the drive flange, a rotary cylinder barrel mounted for rotation about an axis inclined or inclinable to the drive flange axis and having a plurality of cylinders parallel or inclined to the rotation axis, pistons slidably mounted one in each cylinder, piston rods articulated to the pistons and the slippers to form a plurality of assemblies each comprising a slipper, a piston and a piston rod, a wear plate mounted adjacent to the drive flange, the wear plate including a flat surface against which the slippers are adapted to bear during rotation of the drive flange and cylinder barrel, a radial thrust ball or roller bearing for the drive shaft mounted adjacent to the drive flange and a bearing housing securing the outer race member of the bearing in position, one end surface of the race member being located against a machined surface in the bearing housing and the other end surface of the race member forming a support surface against which the wear plate is axially urged by the force exerted by the slippers, the wear plate including an annular projection by which it bears against the said race member, and said projection being concentric with the circular path of the slippers on the flat surface.

2. A hydraulic pump or motor as claimed in claim 1 wherein the annular contact area between the wear plate projection and the said race member has inner and outer radii which respectively are less than and greater than the radius of the circular path of the centres of the slippers.

References Cited by the Examiner

UNITED STATES PATENTS 3,180,276 4/1965 Andrews et al. ------ 103—162

FOREIGN PATENTS 70,532 8/1952 Netherlands.

MARK NEWMAN, *Primary Examiner.*

R. M. VARGO, *Assistant Examiner.*